US008661811B2

(12) United States Patent
Hirano et al.

(10) Patent No.: US 8,661,811 B2
(45) Date of Patent: Mar. 4, 2014

(54) VEHICLE BRAKE DEVICE

(75) Inventors: Risa Hirano, Nagano (JP); Kouji Sakai, Nagano (JP); Hiromitsu Takizawa, Nagano (JP); Hideki Hidume, Nagano (JP)

(73) Assignee: Nissin Kogyo Co., Ltd., Nagano (JP)

( * ) Notice: Subject to any disclaimer, the term of this patent is extended or adjusted under 35 U.S.C. 154(b) by 848 days.

(21) Appl. No.: 12/839,555

(22) Filed: Jul. 20, 2010

(65) Prior Publication Data

US 2011/0016861 A1    Jan. 27, 2011

(30) Foreign Application Priority Data

Jul. 21, 2009 (JP) .................. 2009-170484
Jul. 21, 2009 (JP) .................. 2009-170485

(51) Int. Cl.
*B60T 13/14* (2006.01)
(52) U.S. Cl.
USPC ........................................ 60/552; 60/547.1
(58) Field of Classification Search
USPC ................. 60/547.1, 552, 553, 554
See application file for complete search history.

(56) References Cited

U.S. PATENT DOCUMENTS 7,293,413 B2 * 11/2007 Tagata et al. .................. 60/552

FOREIGN PATENT DOCUMENTS

| DE | 102006015104 | 10/2006 |
| JP | 2005162127 | 6/2005 |
| JP | 2006-282012 | 10/2006 |

OTHER PUBLICATIONS

Extended European Search Report for European Application No. 10170269.4-2423, dated Dec. 20, 2010.
Japanese Office Action for corresponding Japanese Appl. No. 2009-170484 dated May 13, 2011 (English translation attached), Dispatch date May 16, 2011.
Japanese Office Action for corresponding Japanese Appl. No. 2009-170485 dated May 13, 2011 (English translation attached), Dispatch date May 16, 2011.

\* cited by examiner

*Primary Examiner* — Thomas E Lazo
(74) *Attorney, Agent, or Firm* — Andrew M. Calderon; Roberts Mlotkowski Safran & Cole, P.C.

(57) ABSTRACT

A vehicle brake device includes an elastic body being formed such that a circulation of an operation fluid is permitted from a front end to a rear end of the elastic body until a filling rate of the elastic body reaches a predetermined value in a filling area where deformation of the elastic body is stopped by restraint of a control piston in a state where a forward stroke of the control piston is less than at least a predetermined stroke, but the circulation of the operation fluid is stopped when the filling rate reaches the predetermined value or more.

17 Claims, 8 Drawing Sheets

VEHICLE BRAKE DEVICE

BACKGROUND

1. Field of the Invention

The present invention relates a vehicle brake device including: a fluid pressure booster which includes a control piston having a front end wall formed at its front end and formed in a bottomed cylindrical shape, and which adjusts and applies a fluid pressure of a fluid pressure generating source to a boosting fluid pressure chamber in accordance with the operation of the control piston in the axial direction so that a reaction force based on a fluid pressure of the boosting fluid pressure chamber is equal to a brake operation input from a brake operation member; and a stroke simulator which includes: a simulator piston fluid-tightly and slidably connected to the rear portion of the control piston while forming a stroke fluid chamber for introducing an operation fluid thereinto in a gap with respect to the front end wall, and connected to the brake operation member; a guide shaft coaxially disposed inside the control piston while allowing its front end to come into contact with the front end wall or a slide member accommodated in the stroke fluid chamber to be connected to the front end wall and allowing its rear end to be relatively slidably supported to the simulator piston; and an elastic body surrounding the guide shaft while being interposed between the front end wall or the slide member and the simulator piston, and accommodated in the stroke fluid chamber, and which is provided between the control piston and the brake operation member so as to stop a forward movement of the simulator piston relative to the control piston by sealing the operation fluid inside the stroke fluid chamber in a forward stroke not less than a predetermined stroke of the control piston, wherein a master cylinder is operated in accordance with the fluid pressure of the boosting fluid pressure chamber.

2. Description of the Related Art

JP-A-2006-282012 discloses a vehicle brake device having a structure in which a stroke simulator including an elastic body interposed between a control piston and an input piston connected to a brake operation member, a guide shaft passing through the elastic body, and the like is provided between the brake operation member and the control piston of a fluid pressure booster, and a relative forward movement of the input piston with respect to the control piston is stopped by sealing an operation fluid introduced into the control piston inside the control piston during a forward stroke not less than a predetermined stroke of the control piston.

However, although the elastic body is allowed to have hysteresis involved with a brake operation stroke and a brake operation input while being deformed in response to a brake operation of the brake operation member to be brought into contact with the inner surface of the control piston, a predetermined hysteresis is not obtained when the operation fluid is locked between the control piston and the elastic body due to the deformation of the elastic body before the forward stroke of the control piston reaches a predetermined stroke. For this reason, in the vehicle brake device disclosed in JP-A-2006-282012, a circulation path used for permitting the circulation of the operation fluid is provided in the guide shaft and the slide member coming into contact with the front end of the guide shaft and connected to the front end wall of the control piston so as to prevent the operation fluid from being locked between the control piston and the elastic body before the forward stroke of the control piston reaches a predetermined stroke. Accordingly, in such a structure, since the circulation path is formed in the guide shaft and the slide member, a perforating needs to be performed thereon. As a result, the processing cost is increased, and the structure is complex.

SUMMARY

The present invention is contrived in consideration of such circumstances, and an object of the invention is to provide a vehicle brake device designed to improve the stroke sensation and to prevent the operation fluid from being locked between the control piston and the elastic body before the forward stroke of the control piston of the stroke simulator reaches a predetermined stroke while avoiding an increase in the processing cost and a complex structure.

In order to achieve the above-described object, according to a first aspect of the invention, provided is a vehicle brake device including: a fluid pressure booster including a control piston having a front end wall formed at its front end and formed in a bottomed cylindrical shape, the fluid pressure booster being configured to adjust and apply a fluid pressure of a fluid pressure generating source to a boosting fluid pressure chamber in accordance with the operation of the control piston in the axial direction so that a reaction force based on a fluid pressure of the boosting fluid pressure chamber is equal to a brake operation input from a brake operation member; and a stroke simulator including: a simulator piston fluid-tightly and slidably connected to the rear portion of the control piston while forming a stroke fluid chamber for introducing an operation fluid thereinto in a gap with respect to the front end wall, and connected to the brake operation member; a guide shaft coaxially disposed inside the control piston while allowing its front end to come into contact with the front end wall or a slide member accommodated in the stroke fluid chamber to be connected to the front end wall and allowing its rear end to be relatively slidably supported to the simulator piston; and an elastic body surrounding the guide shaft while being interposed between the front end wall or the slide member and the simulator piston, and accommodated in the stroke fluid chamber, and which is provided between the control piston and the brake operation member so as to stop a forward movement of the simulator piston relative to the control piston by sealing the operation fluid inside the stroke fluid chamber in a forward stroke not less than a predetermined stroke of the control piston, wherein: a master cylinder is operated in accordance with the fluid pressure of the boosting fluid pressure chamber; and the elastic body is formed such that the circulation of the operation fluid is permitted from the front end to the rear end of the elastic body until a filling rate of the elastic body reaches a predetermined value in a filling area where deformation of the elastic body is stopped by restraint of the control piston in the state where a forward stroke of the control piston is less than at least the predetermined stroke, but the circulation of the operation fluid is stopped when the filling rate reaches the predetermined value or more.

Further, the "filling rate" of the invention indicates the ratio of the volume of the elastic body existing in a space defined by the inner periphery of the control piston, the outer periphery of the guide shaft, the rear surface of the member coming into contact with the front end of the elastic body, and the front end surface of the simulator piston.

In addition, according to a second aspect of the invention, provided is the vehicle brake device of the first aspect, wherein the elastic body is formed such that a circulation path is formed in at least one of a gap between the inner peripheral portion of the control piston and the outer peripheral portion of the elastic body, a gap between the front end wall of the control piston or the slide member and the front end of the elastic body, a gap between the simulator piston and the rear end of the elastic body, and a gap between the outer peripheral portion of the guide shaft and the inner peripheral portion of the elastic body, where the circulation path is formed to be closed when the elastic body comes into close contact with at least one of the inner peripheral portion of the control piston, the outer peripheral portion of the guide shaft, the front end wall of the control piston or the slide member, and the simulator piston, and is used to permit the circulation of the operation fluid from the front end to the rear end of the elastic body.

According to a third aspect of the invention, provided is the vehicle brake device of the first aspect, wherein the elastic body is provided with a perforation hole which is provided between the front end and the rear end of the elastic body, and is closed when the elastic body is compressed in the radial direction, the perforation hole constituting at least a part of the circulation path for permitting the circulation of the operation fluid.

According to a fourth aspect of the invention, provided is the vehicle brake device according to any one of first to third aspects, wherein the elastic body is formed of rubber.

In addition, the brake pedal 11 of the embodiment corresponds to the brake operation member of the invention.

According to a fifth aspect of the invention, provided is a vehicle brake device including: a fluid pressure booster including a control piston having a front end wall formed at its front end and formed in a bottomed cylindrical shape, and being configured to adjust and apply a fluid pressure of a fluid pressure generating source to a boosting fluid pressure chamber in accordance with the operation of the control piston in the axial direction so that a reaction force based on a fluid pressure of the boosting fluid pressure chamber is equal to a brake operation input from a brake operation member; and a stroke simulator including: a simulator piston fluid-tightly and slidably connected to the rear portion of the control piston while forming a stroke fluid chamber for introducing an operation fluid thereinto in a gap with respect to the front end wall, and connected to the brake operation member; a guide shaft coaxially disposed inside the control piston while allowing its front end to come into contact with the front end wall or a slide member accommodated in the stroke fluid chamber to be connected to the front end wall and allowing its rear end to be relatively slidably supported to the simulator piston; and an elastic body surrounding the guide shaft while being interposed between the front end wall or the slide member and the simulator piston, and accommodated in the stroke fluid chamber, and which is provided between the control piston and the brake operation member so as to stop a forward movement of the simulator piston relative to the control piston by sealing the operation fluid inside the stroke fluid chamber in a forward stroke not less than a predetermined stroke of the control piston, wherein: a master cylinder is operated in accordance with the fluid pressure of the boosting fluid pressure chamber; and the elastic body is formed in a shape in which the circulation of the operation fluid is permitted from the front end to the rear end of the elastic body in the state where a forward stroke of the control piston is less than at least the predetermined stroke.

According to a sixth aspect of the invention, provided is the vehicle brake device of the fifth aspect, wherein the elastic body is formed such that a circulation path is formed in at least one of a gap between the inner peripheral portion of the control piston and the outer peripheral portion of the elastic body, a gap between the front end wall of the control piston or the slide member and the front end of the elastic body, a gap between the simulator piston and the rear end of the elastic body, and a gap between the outer peripheral portion of the guide shaft and the inner peripheral portion of the elastic body so as to permit the circulation of the operation fluid from the front end to the rear end of the elastic body.

According to a seventh aspect of the invention, provided is the vehicle brake device of the sixth aspect, wherein a groove is formed in at least one of the inner peripheral portion and the front and rear both ends of the elastic body and the outer peripheral portion of the elastic body so as to form the circulation path for permitting the circulation of the operation fluid from the front end to the rear end of the elastic body.

According to a eighth aspect of the invention, provided is the vehicle brake device of the fifth aspect, wherein the elastic body is provided with a perforation hole which is provided between the front end and the rear end of the elastic body so as to constitute at least a part of the circulation path for permitting the circulation of the operation fluid.

According to a ninth aspect of the invention, provided is the vehicle brake device of any one of the fifth to eighth aspects, wherein the elastic body is formed of rubber.

According to the first to ninth aspects, the elastic body is molded, and the elastic body is formed to be equipped with the circulation path so as to prevent the operation fluid from being locked between the control piston and the elastic body due to the distortion of the elastic body before the forward stroke of the control piston reaches the predetermined stroke. Accordingly, compared with the known elastic body in which the circulation path is formed in the guide shaft or the slide member, it is possible to reduce processing costs, and to simplify the shape of the guide shaft or the shape of the slide member when the front end of the guide shaft comes into contact with the slide member connected to the front end wall of the control piston. Further, according to the first to fourth aspects, since the circulation path is closed when the filling rate of the elastic body reaches the predetermined value or more, the operation fluid is sealed between the elastic body and the control piston, and hence an internal pressure occurs in a part of the inside of the control piston. Accordingly, it is possible to improve the stroke sensation with the help of the improvement of the stroke characteristics by gradually exhibiting the elastic effect, the filling effect, and the effect of the internal pressure of the control piston so that the elastic body is not deformed more than necessary in the high operation area of the brake operation member.

In addition, particularly, according to the second or third aspect, since a particular structure for closing the circulation path does not need to be prepared, and the circulation path is closed by the elastic body, it is possible to close the circulation path at low cost.

In addition, according to any one of the sixth to ninth aspects, it is possible to easily mold the elastic body at a low cost by simplifying the shape of the elastic body.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Figure 1:
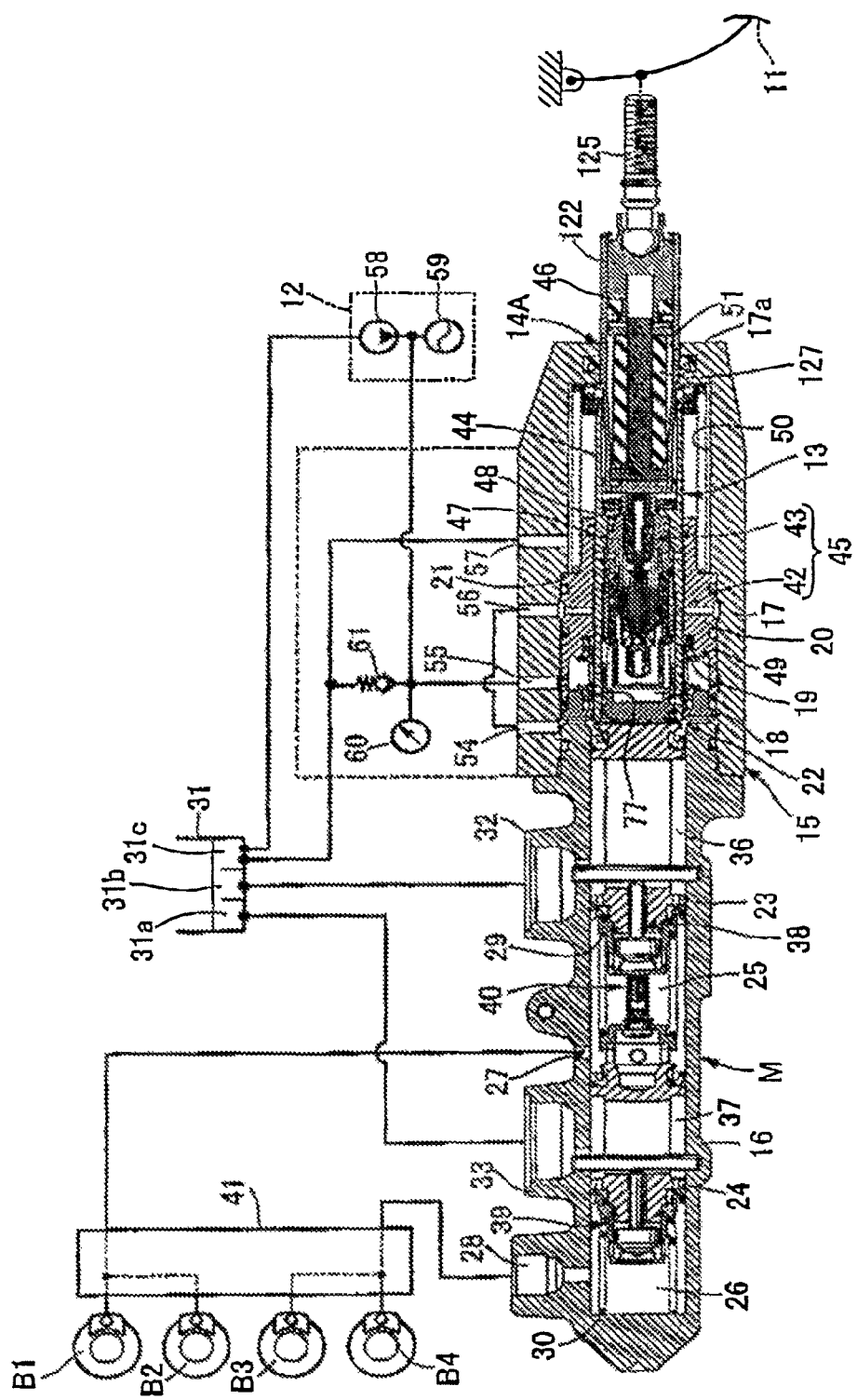
FIG. 1 is a brake fluid pressure systematic diagram showing the entire configuration of a vehicle brake device of a first embodiment.

Hereinafter, embodiments of the invention will be described with reference to the accompanying drawings.

First Embodiment

The first embodiment of the invention will be described with reference to FIGS. 1 to 7. First, in FIG. 1, a brake device of a four-wheeled vehicle includes a tandem master cylinder M, a fluid pressure booster 13 which adjusts a fluid pressure of a fluid pressure generating source 12 in response to a brake operation force input from a brake pedal 11 as a brake operation member, and applies the adjusted fluid pressure to the master cylinder M, and a stroke simulator 14A which is provided between the brake pedal 11 and the fluid pressure booster 13.

A casing 15 which is common to the master cylinder M and the fluid pressure booster 13 includes a bottomed cylinder body 16 of which the front end is closed, a body 17 which has an inward flange body 17a formed at the rear end thereof to be formed in a cylindrical shape and to be coaxially coupled to the rear portion of the cylinder body 16, an annular body 18 which is interposed between the body 17 and the rear end of the cylinder body 16, a separator 19, and a sleeve 20. The rear end of the cylinder body 16 is fluid-tightly fitted to the front end of the body 17, and the annular body 18 is fluid-tightly fitted to the body 17 to be brought into contact with the rear end of the cylinder body 16. The sleeve 20 is fitted to the front end of the body 17 so that the backward limit is regulated by an annular stepped portion 21 provided in the inner peripheral middle portion of the body 17, and the separator 19 is interposed between the annular body 18 and the sleeve 20.

In the master cylinder M, a rear master piston 23 having a rear surface coming into contact with a boosting fluid pressure chamber 22 and urged backward is slidably fitted to the cylinder body 16, a front master piston 24 urged backward and disposed before the rear master piston is slidably fitted to the cylinder body 16, a rear output fluid pressure chamber 25 is formed between the rear master piston 23 and the front master piston 24, and then a front output fluid pressure chamber 26 is formed between the front master piston 24 and the front end blocking portion of the cylinder body 16.

The cylinder body 16 is provided with a rear output port 27 communicating with the rear output fluid pressure chamber 25 and a front output port 28 communicating with the front output fluid pressure chamber 26. In addition, a rear return spring 29 is elastically provided between the rear master piston 23 and the front master piston 24 inside the rear output fluid pressure chamber 25 so as to urge the rear master piston 23 backward. A front return spring 30 is elastically provided between the front master piston 24 and the front blocking end of the cylinder body 16 inside the front output fluid pressure chamber 26 so as to urge the front master piston 24 backward.

A reservoir 31 is attached to the master cylinder M, and first, second, and third fluid storage chambers 31a, 31b, and 31c are defined in the reservoir 31. In addition, a cylindrical rear connection cylinder portion 32 communicating with the second fluid storage chamber 31b and a cylindrical front connection cylinder portion 33 communicating with the first fluid storage chamber 31a are integrated with the cylinder body 16 so as to protrude upward at positions spaced from each other in the axial direction.

A rear supply fluid chamber 36 communicating with the inside of the rear connection cylinder portion 32 is formed in an annular shape between the inner surface of the cylinder body 16 and the outer periphery of the rear master piston 23, and the brake fluid supplied from the second fluid storage chamber 31b of the reservoir 31 is made to be supplied to the rear supply fluid chamber 36. In addition, a front supply fluid chamber 37 communicating with the inside of the front connection cylinder portion 33 is formed in an annular shape between the inner surface of the cylinder body 16 and the outer periphery of the front master piston 24, and the brake fluid supplied from the first fluid storage chamber 31a of the reservoir 31 is made to be supplied to the front supply fluid chamber 37.

A generally known center valve 38 is mounted to the rear master piston 23 so as to permit the communication between the rear output fluid chamber 25 and the rear supply fluid chamber 36 when the rear master piston 23 is returned to the backward limit position. A generally known center valve 39 is mounted to the front master piston 24 so as to permit the communication between the front output fluid pressure chamber 26 and the front supply fluid chamber 37 when the front master piston 24 is returned to the backward limit position.

That is, the master cylinder M is configured as a center valve type in which the center valves 38 and 39 are respectively mounted to the rear master piston 23 and the front master piston 24 so that the center valves are operated to be opened to supply the brake fluid from the reservoir 31 to the rear and front output fluid pressure chambers 25 and 26 when the master pistons 23 and 24 are moved backward. In addition, a maximum gap regulation means 40 is provided between the rear and front master pistons 23 and 24 so as to regulate the maximum gap between the master pistons 23 and 24.

The rear output port 27 of the master cylinder M is connected to a wheel brake B1 for a right front wheel and a wheel brake B2 for a left rear wheel via a fluid pressure modulator 41. In addition, the front output port 28 is connected to a wheel brake B3 for a left front wheel and a wheel brake B4 for a right rear wheel via a fluid pressure modulator 41. Then, the fluid pressure modulator 41 is a generally known fluid pressure modulator which is capable of controlling the brake fluid pressure output from the rear and front output ports 27 and 28 so that an anti-lock brake control is performed in an operation state of the brake and an automatic brake control such as a traction control is performed in a non-operation state of the brake.

Figure 2:
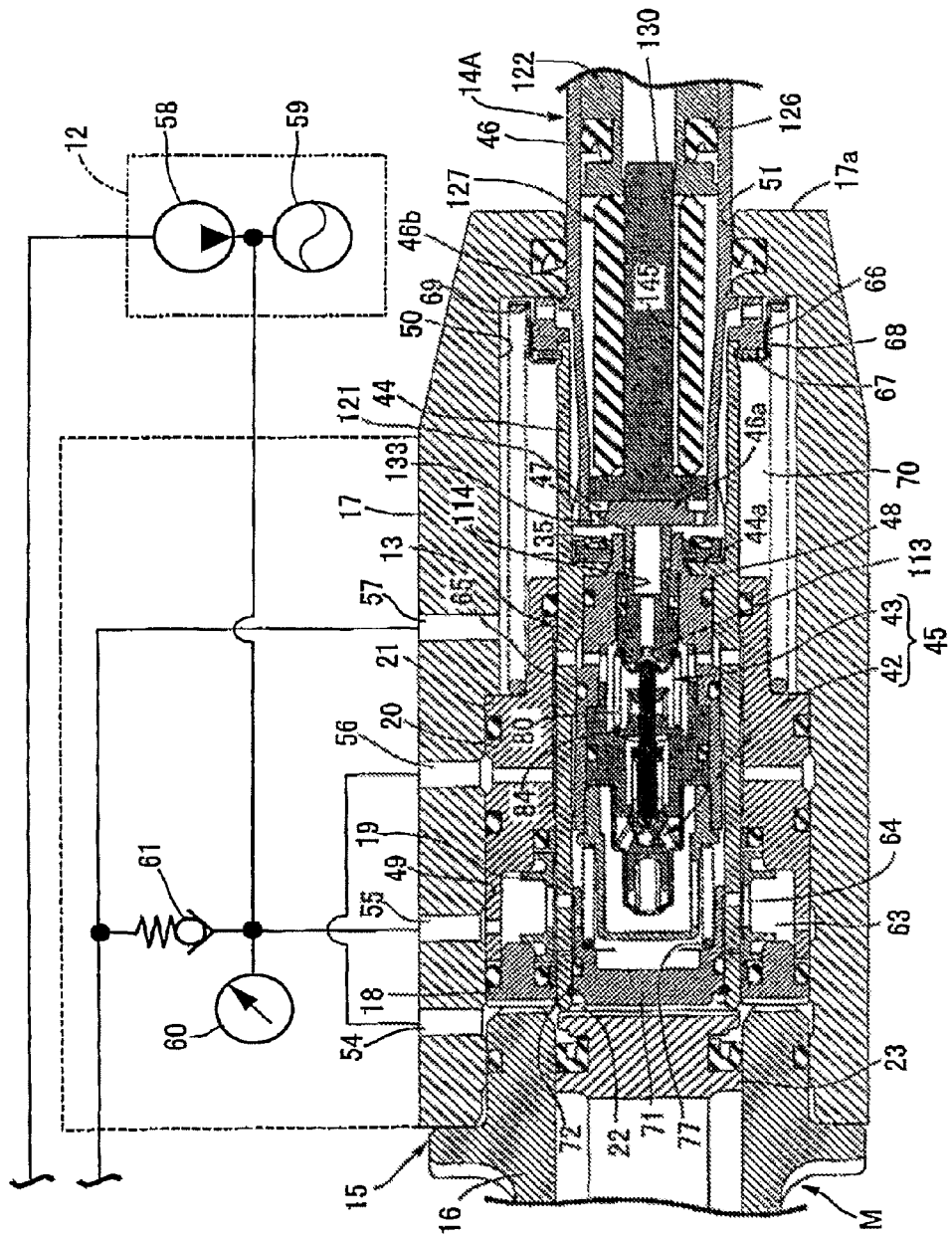
FIG. 2 is a longitudinal sectional view showing a part of a fluid pressure booster and a stroke simulator.

In FIG. 2, the fluid pressure booster 13 includes a cylindrical backup piston 44 which is accommodated in the casing 15 while the front end thereof faces the boosting fluid pressure chamber 22, a pressure adjustment valve means 45 which includes a pressure increasing valve 42 and a pressure decreasing valve 43 and is installed inside the backup piston 44, a control piston 46 which performs the pressure adjustment operation of the pressure adjustment valve means 45 so that a reaction force based on the fluid pressure of the boosting fluid pressure chamber 22 and the brake operation input from the brake pedal 11 are harmonized with each other, a first reaction piston 47 which is provided between the pressure adjustment valve means 45 and the control piston 46 so as to apply a reaction based on the fluid pressure of the boosting fluid pressure chamber 22 to the control piston 46, and a second reaction piston 48 which is provided between the backup piston 44 and the first reaction piston 47 so as to apply a reaction force generated from the reaction spring 77 and a fluid pressure output from the fluid pressure generating source 12 to the control piston 46 in addition to the reaction force generated from the first reaction piston 47 when the brake operation input of the brake pedal 11 is increased.

In the body 17 constituting a part of the casing 15 and coaxially coupled to the rear portion of the cylinder body 16, a large diameter hole 49 is formed so as to fit the rear end of the cylinder body 16, the annular body 18, the separator 19, and the sleeve 20 to one another from the front end side thereof, and a middle diameter hole 50 is formed while forming an annular stepped portion 21 between the rear end of the large diameter hole 49 and the middle diameter hole so as to be coaxially connected to the rear end of the large diameter hole 49 and to be smaller than the large diameter hole 49. Then, a small diameter hole 51 smaller than the middle diameter hole 50 is formed in the inward flange portion 17a formed in the rear end of the body 17 so as to regulate the rear end of the middle diameter hole 50.

The annular body 18 and the sleeve 20 are fluid-tightly fitted to the large diameter hole 49 so as to be fitted between the stepped portion 21 and the rear end of the cylinder body 16 while the separator 19 having an inner diameter larger than those of the annular body 18 and the sleeve 20 are fitted to each other. The backup piston 44 is slidably fitted to the annular body 18 and the sleeve 20.

The body 17 is provided with ports sequentially formed from the front side thereof at an interval therebetween, such as a connection port 54 communicating with the boosting fluid pressure chamber 22 which is opened from the inner surface of the large diameter portion 49 at the corresponding position between the annular body 18 and the cylinder body 16 of the master cylinder M, an input port 55 which is opened from the inner surface of the large diameter portion 49 at the corresponding position between the sleeve 20 and the annular body 18, an output port 56 which is opened from the inner surface of the large diameter hole 49 at the axial middle portion of the sleeve 20 and is connected to the connection port 54, and a release port 57 which is opened from the inner surface of the front portion of the middle diameter hole 50, where the release port 57 is connected to the third fluid storage chamber 31c of the reservoir 31.

The fluid pressure generating source 12 is connected to the input port 55. The fluid pressure generating source 12 includes a pump 58 which pumps up the brake fluid from the third fluid storage chamber 31c of the reservoir 31, and an accumulator 59 which is connected to the discharge side of the pump 58. The operation of the pump 58 is controlled in response to the fluid pressure of the accumulator 59 detected by a fluid pressure sensor 60. The fluid pressure generating source 12 is capable of outputting a constantly high fluid pressure regardless of the operation of the brake pedal 11, and the fluid pressure output from the fluid pressure generating source 12 is supplied to the input port 55. In addition, a relief valve 61 is provided between the discharge side of the fluid pressure generating source 12 and the third fluid storage chamber 31c of the reservoir 31. Then, the relief valve 61 and the fluid pressure path connecting the input port 55 and the connection port 54 are provided in the body 17 of the casing 15, and the fluid pressure sensor 60 is also disposed in the body 17.

The front portion of the backup piston 44 is fluid-tightly and slidably fitted to the annular body 18, and the middle portion of the backup piston 44 is fluid-tightly and slidably fitted to the sleeve 20. In addition, an input-side annular chamber 63 fluid-tightly sealed with respect to the boosting fluid pressure chamber 22 is formed so as to communicate with the input port 55 between the outer periphery of the backup piston 44 and the annular body 18 and the sleeve 20 of the casing 15 at the portion provided with the separator 19 interposed between the annular body 18 and the sleeve 20. The separator 19 disposed inside the input-side annular chamber 63 is provided with a plurality of permeation holes 64 while preventing the incurrence of the division of the input-side annular chamber 63. In addition, an output-side annular chamber 65 fluid-tightly sealed with respect to the input-side annular chamber 63 is formed so as to communicate with the output port 56 between the backup piston 44 and the inner periphery of the sleeve 20.

An annular stopper 66 comes into contact with the inward flange portion 17a of the body 17. A coil-shaped spring 69 surrounding the rear half portion of the backup piston 44 is elastically provided between the sleeve 20 and a retainer 68 which comes into contact with the front end side of a snap ring 67, mounted to the outer periphery of the rear end of the backup piston 44, so as to engage with the snap ring. The backup piston 44 is urged backward by a spring force of the spring 69. Then, the position where the snap ring 67 comes into contact with a stopper 66 coming into contact with the inward flange portion 17a of the body 17 is the backward limit of the backup piston 44. The front end of the backup piston 44 located at the backward limit is disposed in the boosting fluid pressure chamber 22 and comes into contact with the whole circumference of the outer peripheral edge of the rear master piston 23 which is in a non-operation state, and this state is also the backward limit of the rear master piston 23.

A release chamber 70 is formed between the inward flange portion 17a and the sleeve 20 inside the body 17 so as to surround the backup piston 44 while accommodating the spring 69, and to fluid-tightly seal a gap with respect to the output-side annular chamber 65.

An inward flange portion 44a protruding inward in the radial direction is integrated with the inner surface of the axial middle portion of the backup piston 44. The second reaction piston 48 having a stepped cylindrical shape is slidably fitted to the backup piston 44 in front of the inward flange portion 44a, and the first reaction piston 47 is fitted to the second reaction piston 48 so as to be relatively slidable in the same axis.

Figure 3:
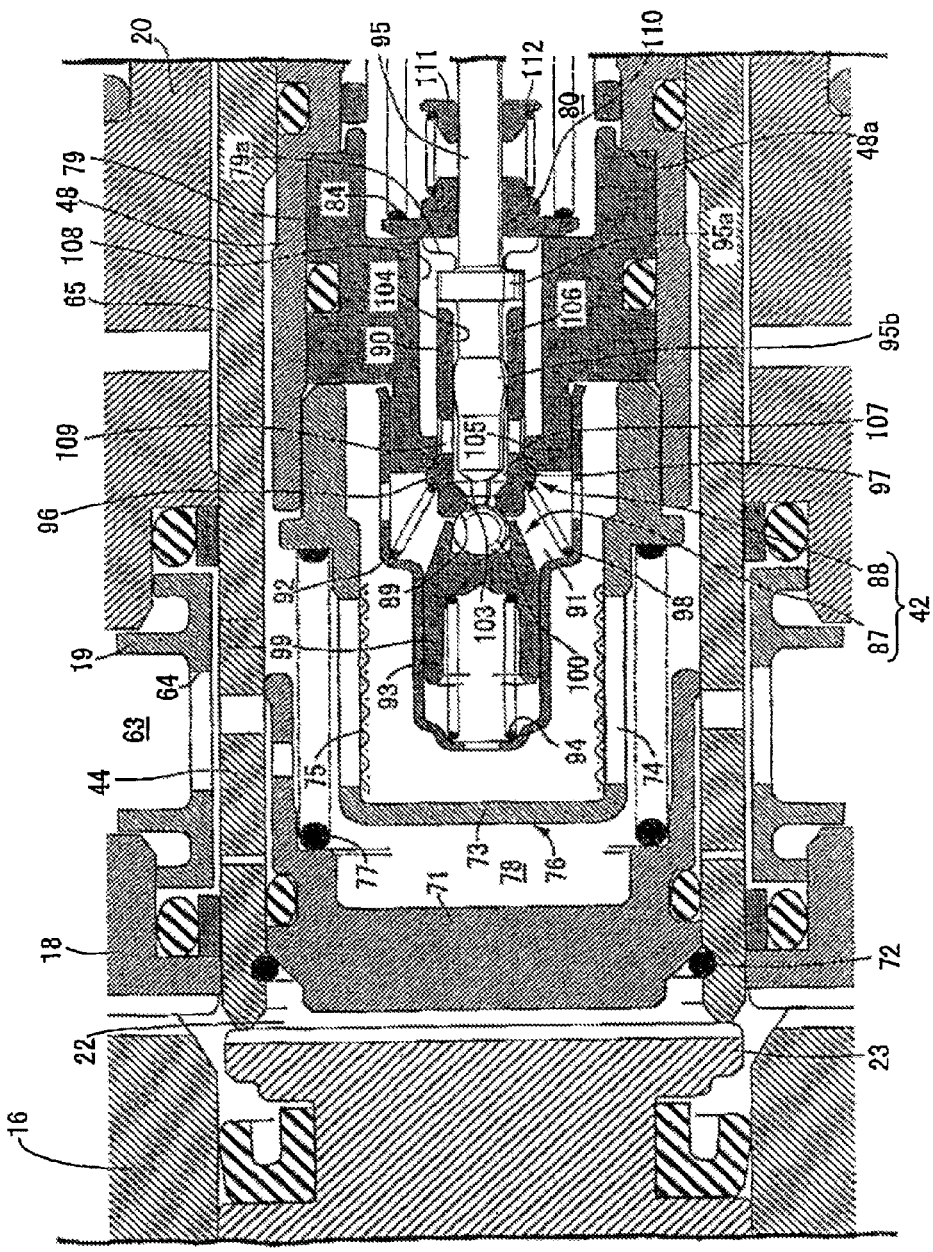
FIG. 3 is an enlarged longitudinal sectional view of the vicinity of a pressure increasing valve in the fluid pressure booster.

In FIG. 3, an end wall member 71 having a front surface disposed in the boosting fluid pressure chamber 22 is fluid-tightly fitted to the front end of the backup piston 44. A snap ring 72, coming into contact with the outer peripheral edge of the end wall member 71 from the front side thereof to engage therewith, is mounted to the inner periphery of the front end of the backup piston 44. In addition, a rear portion of a filter frame 73, formed in a bottomed cylindrical shape and having a plurality of openings 74 in the circumferential direction, is press-inserted to the front end of the second reaction piston 48. A filter 76 is formed by installing a mesh member 75 at the inner surface of the filter frame 73. By the spring force of the reaction spring 77 elastically provided between the filter 76 and the end wall member 71, the second reaction piston 48 is urged by the inward flange portion 44a of the backup piston 44 from the front side to the side coming into contact with the inward flange portion.

An input chamber 78 is formed inside the backup piston 44 between the end wall member 71 and the group of the second reaction piston 48 and the filter 76, and the input chamber 78 communicates with the input-side annular chamber 63. That is, the high-pressure brake fluid generated from the fluid pressure generating source 12 is introduced into the input chamber 78.

An annular stepped portion 48a facing forward is provided in the inner surface of the middle portion of the second reaction piston 48. A valve seat member 79, having a stepped cylindrical shape and fluid-tightly fitted to the second reaction piston 48, is fitted to the stepped portion 48a while coming into contact therewith in the front portion of the second reaction piston 48. The valve seat member 79 is interposed between the stepped portion 48a and the rear end of the filter frame 73 press-inserted to the front end of the second reaction piston 48. Accordingly, the valve seat member 79 is fluid-tightly fitted and fixed to the front portion of the second reaction piston 48, and is supported to the backup piston 44 via the second reaction piston 48.

Meanwhile, the first reaction piston 47 is fluid-tightly and slidably fitted to the rear portion of the second reaction piston 48 as shown in FIG. 2. A pressure adjustment chamber 80 is formed inside the second reaction piston 48 so as to face the rear surface of the valve seat member 79 and to face the front end of the first reaction piston 47, and the pressure adjustment chamber 80 communicates with the output-side annular chamber 65, that is, the output port 56.

Figure 4:
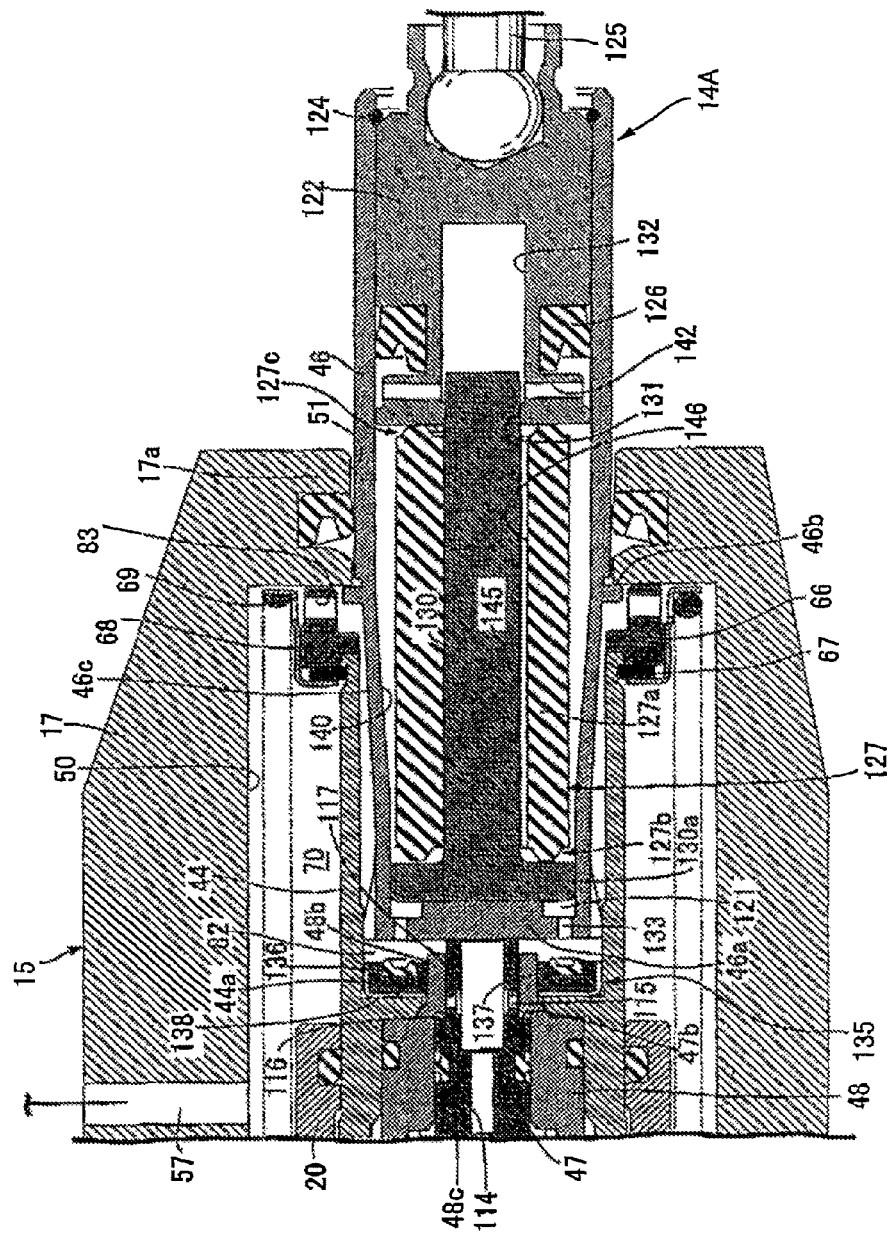
FIG. 4 is an enlarged longitudinal sectional view of the stroke simulator.

Referring to FIG. 4, the control piston 46, formed in a bottomed cylindrical shape with a front end wall 46a formed at the front end thereof, is coaxially inserted to the rear portion of the backup piston 44 while being fluid-tightly and slidably fitted to the small diameter hole 51 formed by the inward flange portion 17a of the rear end of the body 17. Further, a regulation protrusion portion 46b is integrated with the whole circumference of the outer surface of the control piston 46 in a protruding manner so as to regulate the backward limit of the control piston 46 in such a manner that the regulation protrusion portion comes into contact with the front side of the inner peripheral edge of the inward flange portion 17a so as to be fitted thereto.

A release chamber 82 is formed between the control piston 46 and the backup piston 44 in rear of the inward flange portion 44a, and the release chamber 82 communicates with the release chamber 70 via a communication hole 83 provided in the stopper 66. That is, the release chamber 82 communicates with the third fluid storage chamber 31c of the reservoir 31 via the communication hole 83, the release chamber 70, and the release port 57.

The rear end of the first reaction piston 47 comes into contact with the front end wall 46a of the control piston 46 at all times. In addition, a spring 84, exhibiting a spring force for urging the rear end of the first reaction piston 47 to come into contact with the front end wall 46a of the front end of the control piston 46, is accommodated in the pressure adjustment chamber 80 as shown in FIGS. 2 and 3, and the spring force of the spring 84 is set to be extremely small.

In addition, an extension cylinder portion 48b, coaxially surrounding the rear portion of the first reaction piston 47 and inserted through the inner periphery of the inward flange portion 44a, is coaxially integrated with the second reaction piston 48. In the state where the second reaction piston 48 is located at the backward limit while coming into contact with the inward flange portion 44a of the backup piston 44, the rear end of the extension cylinder portion 48b of the second reaction piston 48 is disposed in front of the rear end of the first reaction piston 47.

Accordingly, when the control piston 46 is operated to move forward relative to the backup piston 44, the first reaction piston 47 moves forward together with the control piston 46, and the rear end of the second reaction piston 48 comes into contact with the front end wall 46a of the front end of the control piston 46 when the brake operation input of the brake pedal 11 increases so that the forward movement amount of the control piston 46 reaches a predetermined value or more.

Again, paying attention to FIG. 3, the pressure increasing valve 42 includes first and second valve means 87 and 88 which are arranged in the axial direction of the control piston 46 so as to be sequentially opened in accordance with an increase in the brake operation input of the brake pedal 11. The seal diameter of the second valve means 88 is set to be larger than the seal diameter of the first valve means 87, and the second valve means 88 is configured to be opened before the flow rate of the first valve means 87 in an opened state becomes a maximum value.

The first valve means 87 includes a cylindrical slide member 90 which has a first valve seat 89 formed at the front end thereof, a retainer 92 which has a valve chamber 91 formed therein to communicate with the input the fluid pressure generating source 12, a valve body 93 which is slidably fitted to the retainer 92 to be seated on the first valve seat 89 disposed inside the valve chamber 91, a first valve spring 94 which is provided between the retainer 92 and the valve body 93 while urging the valve body 93 so as to be seated on the first valve seat 89, and a pressure rod 95 which is synchronized and connected to the control piston 46 so as to come into contact with the valve body and to be relatively movably inserted into the slide member 90 in the axial direction.

In addition, the second valve means 88 includes a valve portion 96 which is provided in the slide member 90 as the constituent commonly used in the first valve means 87, a stepped cylindrical valve seat member 79 which is slidably fitted to the slide member 90 and has the second valve seat 97 formed at the front end thereof, the retainer 92 which is the constituent commonly used in the first valve means 87, a second valve spring 98 which is provided between the retainer 92 and the slide member 90 while urging the valve portion 96 to be seated on the second valve seat 97, and the pressure rod 95 which is the constituent commonly used in the first valve means 87.

The retainer 92 is press-inserted to the outer periphery of the front end of the valve seat member 79. The valve chamber 91 is formed inside the retainer 92 so as to face the first valve seat 89 of the front end of the slide member 90 and the second valve seat 97 of the front end of the valve member 79, and the valve chamber 91 communicates with the input chamber 78 communicating with the fluid pressure generating source 12.

The valve body 93 of the first valve means 87 is formed by fixing a spherical body 100 capable of sitting on the first valve seat 89 to a rear portion of a retaining member 99 slidably fitted to the front portion of the retainer 92. That is, the valve body 93 is slidably fitted to the retainer 92, and the first valve spring 94 is elastically provided between the retaining member 99 and the front end of the retainer 92.

The slide member 90 is provided with a first valve hole 103 which has a front end opened from the center portion of the first valve seat 89, and a slide hole 104 which has a diameter larger than that of the first valve hole 103 so as to allow the front end to communicate with the first valve hole 103 and to open the rear end, where the first valve hole and the slide hole are provided in the same axis. On the other hand, the valve seat member 79 is provided with a second valve hole 105 which has a front end opened from the center portion of the second valve seat 97, and a slide hole 106 which has the same diameter as that of the second valve hole 105 so as to allow the front end to communicate with the second valve hole 105 and to open the rear end, where the second valve hole and the slide hole are provided in the same axis. The slide member 90 movably passes through the second valve hole 105 in the same axis, and is slidably fitted to the slide hole 106.

The pressure rod 95 is slidably fitted to the slide hole 104 of the slide member 90 while disposing the front end inside the first valve hole 103. The pressure rod 95 inside the valve seat member 79 is integrated with a pressure flange portion 95*a* which comes into contact with the rear end of the slide member 90 so as to press and move the slide member 90 forward. The valve seat member is integrated with a regulation flange portion 79*a* which protrudes inward in the radial direction from the inner surface of the rear portion of the slide hole 106 and regulates the backward limit of the pressure rod 95 while coming into contact with the pressure flange portion 95 from the rear side thereof.

The pressure rod 95 in front of the pressure flange portion 95*a* is provided with a slide portion 95*b* which slides on the inner surface of the slide hole 104. The pressure rod 95 in front of the slide portion 95*b* is formed to have a small diameter while forming an annular chamber 107 with respect to the inner surface of the slide member 90.

Then, when the valve body 93 is pressed by the front end of the pressure rod 95 so that the valve chamber 93 is separated from the first valve body 89, the valve body 91 communicates with the annular chamber 107. Further, in the state where the pressure flange portion 95*a* comes into contact with the regulation stepped portion 79*a*, the distance between the valve body 93 and the front end of the pressure rod 95 is smaller than the distance between the pressure flange portion 95*a* and the rear end of the slide member 90. When the pressure rod 95 is further moved backward after the valve body 93 separates from the first valve seat 89 during the forward movement of the pressure rod 95, the slide member 90 is pressed forward by the pressure flange portion 95*a*.

The valve portion 96 of the second valve means 88 is provided in the slide member 90 in rear of the first valve seat 89, and has the seal diameter larger than the seal diameter when the valve body 93 is seated on the first valve seat 89, so that the valve portion can be seated on the second valve seat 97. Then, when the pressure rod 95 is further moved forward after opening the first valve means 87 so that the slide member 90 is pressed forward, the valve portion 96 separates from the second valve seat 97, and the second valve means 88 is opened.

A plurality of circulation grooves 108 is provided in the inner surface of the slide hole 106 of the valve seat member 79 so as to open the rear end from the rear end of the valve seat member 79, and the slide member 90 is provided with a plurality of communication holes 109 which allows the annular chamber 107 to communicate with each of the circulation holes 108.

The rear portion of the pressure rod 95 protrudes into the pressure adjustment chamber 80, and the pressure rod 95 inside the pressure adjustment chamber 80 is slidably fitted to a center portion of a disk-shaped rectification member 110 which rectifies the circulation of the brake fluid from the first and second valve means 87 and 88 to the pressure adjustment chamber 80. Then, the rectification member 110 is capable of closing the opening end of the slide hole 106 toward the pressure adjustment chamber 80 by coming into contact with the surface facing the pressure adjustment chamber 80 of the valve seat member 79.

In rear of the rectification member 110, the pressure rod 95 is press-fitted and fixed to a spring support member 111, and a spring 112 is elastically provided between the rectification member 110 and the spring support member 111. On the other hand, the front end of the first reaction piston 47 also protrudes into the pressure adjustment chamber 80 in the same axis as that of the pressure rod 95 as shown in FIG. 2, and the spring 84 is elastically provided between the rectification member 110 and the front portion of the first reaction piston 47. Then, in the rectification member 110, the spring forces of the springs 84 and 112 are set to a degree that the rectification member 110 can be separated from the valve seat member 79 as the fluid pressure generated from the fluid pressure generating source 12 acts on the rectification member 110 by opening the first valve means 87 while the rectification member 110 comes into contact with the surface facing the pressure adjustment chamber 80 of the valve seat member 79.

The pressure decreasing valve 43 includes the rear end of the pressure rod 95 and the front end of the first reaction piston 47. The first reaction piston 47 is provided with a valve hole 113 which is closed when the rear end of the pressure rod 9S comes into contact with the front end of the first reaction piston 47, and is opened from the front end of the first reaction piston 47, and a release path 114 which is formed to have a diameter larger than that of the valve hole 113 so as to allow the front end to communicate with the valve hole 113 and to extend to the rear end of the first reaction piston 47, where the valve hole and the release path are provided in the same axis. Since the front end wall 46*a* of the front end of the control piston 46 comes into contact with the rear end of the first reaction piston 47 at all times, the rear end of the release path 114 is substantially closed.

As shown in FIG. 4, the middle portion of the first reaction piston 47 is provided with a plurality of communication holes 115 which allows the inner end to communicate with the release path 114. In a valve opening state in which the pressure decreasing valve 43 separates the rear end of the pressure rod 95 from the front end of the first reaction piston 47 to thereby open the valve hole 113, the operation fluid generated from the release path 114 is circulated to the release chamber 82 via the communication holes 115, the first storage chamber 116, and the orifice 117.

The first storage chamber 116 is formed between the first and second reaction pistons 47 and 48, and is formed in an annular shape surrounding the first reaction piston 47 between an annular stepped portion 47*b* provided in the outer periphery of the first reaction piston 47 while facing backward and an annular stepped portion 48*c* provided in the inner periphery of the second reaction piston 48 while facing forward to be opposite the stepped portion 47*b*. Further, the communication holes 115 are provided in the first reaction piston 47 so as to be located at the corresponding position of the first storage chamber 116, at least when the pressure decreasing valve 43 starts to be opened from the valve closed state.

In addition, the orifice 117 is formed between the outer periphery of the rear portion of the first reaction piston 47 and the inner periphery of the extension cylinder portion 48*b* of the second reaction piston 48. The orifice 117 is formed by setting an annular gap corresponding to a diameter difference portion between the outer periphery of the rear portion of the first reaction piston 47 and the inner periphery of the extension cylinder portion 48*b*.

In such a fluid pressure booster 13, when the brake operation input is input from the brake pedal 11 to the control piston 46 via the stroke simulator 14A, a pressure force acts on the first reaction piston 47 in the forward direction from the control piston 46. Then, when the forward movement amount of the control piston 46 relative to the backup piston 44 is less than a predetermined value, only the first reaction piston 47 comes into contact with the control piston 46. The pressure decreasing valve 43 is opened as the first reaction piston 47 moves forward so that the gap between the pressure adjustment chamber 80 and the release chamber 82 is interrupted, and the control piston 46, the first reaction piston 47, and the pressure rod 95 are further moved forward. In accordance with the forward movement of the pressure rod 95, the first valve means 87 is first opened, and then the second valve means 88 is opened in the pressure increasing valve 42.

In addition, in the valve closed state of the pressure decreasing valve 43, the fluid pressure of the pressure adjustment chamber 80 acts on the front end of the first reaction piston 47. The pressure decreasing valve 43 is opened and the pressure increasing valve 42 is closed in accordance with the backward movement of the first reaction piston 47 and the control piston 46 so that the brake operation input of the brake pedal 11 is equal to the fluid pressure based on the fluid pressure of the pressure adjustment chamber 80. By repetitively opening and closing the pressure increasing valve 42 and the pressure decreasing valve 43 in such a manner, the output fluid pressure of the fluid pressure generating source 12 acts on the pressure adjustment chamber 80 while being adjusted to the boosting fluid pressure in accordance with the brake operation input from the brake pedal 11. In addition, when the forward movement amount of the control piston 46 relative to the backup piston 44 reaches a predetermined value or more, the second reaction piston 48 as well as the first reaction piston 47 comes into contact with the control piston 46, and the spring force of the reaction spring, 77 and the fluid pressure pressing the second reaction piston 48 backward by the fluid pressure of the input chamber 78 are also applied as a reaction force. For this reason, the reaction force acting on the control piston 46 increases.

Paying attention to FIG. 4, the stroke simulator 14A includes a simulator piston 122 which is fluid-tightly and axially slidably fitted to the rear portion of the control piston 46 while forming a stroke fluid chamber 121 in a gap with respect to the front end wall 46a of the front end of the control piston 46, a guide shaft 130 which is coaxially disposed inside the control piston 46 while its front end comes into contact with the front end wall 46a, and its rear portion is relatively slidably supported to the simulator piston 122, and an elastic body 127 which surrounds the guide shaft 130 while being interposed between the front end wall 46a of the control piston 46 and the simulator piston 122, and is accommodated in the stroke fluid chamber 121.

The simulator piston 122 is slidably fitted to the rear portion of the control piston 46 so that the backward limit position is regulated by a snap ring 124 mounted to the rear end of the control piston 46, and a front end of an input rod 125 connected to the brake pedal 11 is continuously connected to the simulator piston 122 in an oscillating manner. That is, the brake operation force in accordance with the operation of the brake pedal 11 is input to the simulator piston 122 via the input rod 125, and the simulator piston 122 is operated to move forward in accordance with the input of the brake operation force. Further, an annular seal member 126 sliding on the inner periphery of the control piston 46 is mounted to the outer periphery of the simulator piston 122.

A disk portion 130a is integrated with the front end of the guide shaft 130 so as to allow the operation fluid to circulate between the inner periphery of the control piston 46 and the outer periphery of the disk portion 130a, and the disk portion 130a comes into contact with the front end wall 46a of the control piston 46. In addition, the center portion of the simulator piston 122 is provided with a slide hole 131 which allows the rear end of the guide shaft 130 to be slidably fitted thereto, and a bottomed hole 132 which is formed to have a diameter larger than that of the slide hole 131 while the front end is connected to the rear portion of the slide hole 131 and the rear end is closed, where the slide hole and the bottomed hole are provided in the same axis. The rear end of the guide shaft 130 protrudes into the bottomed hole 132 as the simulator piston 122 moves forward relative to the guide shaft 130. In addition, instead of the disk portion 130a, a disk member having a shape corresponding to that of the disk portion 130a may come into contact with the front end of the guide shaft 130.

A plurality of openings 133 perforates the front end wall 46a of the front end of the control piston 46 to have the same distance from the center portion of the control piston 46, and is used to allow the stroke fluid chamber 121 to communicate with the release chamber 82 facing the front surface of the front end wall 46a. The stroke fluid chamber 121 inside the control piston 46 communicates with the release chamber 82 when the control openings 133 are opened.

Each of the openings 133 is closed by a seal stopper 135 which is fixed to the backup piston 44 when the control piston 46 moves forward by a predetermined forward stroke or more. The seal stopper 135 includes a retainer 136 which is fixed to the backup piston 44 in such a manner that the outer periphery is press-inserted into the inner periphery of the backup piston 44 so as to come into contact with the inward flange portion 44a, and an elastic seal member 137 which is retained by the retainer 136.

The retainer 136 is formed in an annular shape by a rigid material such as metal, and is press-inserted to the backup piston 44 while forming a minute annular gap with respect to the extension cylinder portion 48b of the second reaction piston 48.

The elastic seal member 137 is formed to block the openings 133 while coming into contact with the front surface of the front and wall 46a in the inside and the outside of the openings 133 along the radial direction of the control piston 46, and is bakingly bonded to the retainer 136.

In addition, the rear surface of the retainer 136 is provided with a communication groove 138 which allows the inside of the retainer 136 to communicate with the outside portion of the control piston 46 in the release chamber 82 while the front end wall 46a of the control piston 46 comes into contact with the elastic seal member 137.

That is, in the state where the front end wall 46a of the control piston 46 comes into contact with the elastic seal member 137, the extension cylinder portion 48b of the second reaction piston 48 also come into contact with the front end wall 46a, and communicates with the outside portion of the control piston 46 of the release chamber 82 via the minute gap and the communication groove 138 between the retainer 136 and the extension cylinder 48b. In the state where the front end wall 46a of the control piston 46 comes into contact with the elastic seal member 137, the space facing the rear portion of the retainer 136 on the inside of the elastic seal member 137 is maintained at the atmospheric pressure, instead of being changed to a negative pressure in accordance with the backward movement of the control piston 46.

The control piston 46 is formed in a bottomed cylindrical shape of which a part of the inner peripheral surface is tapered as it becomes closer to the front side thereof. In the first embodiment, a taper surface 140 is used in which a part of the inner peripheral surface is decreased in diameter in a direction toward the front side of the simulator piston 122, and the front half portion of the control piston 46 is formed as a taper cylinder portion 46c of which the inner peripheral surface is formed as the taper surface 140.

Figure 5:
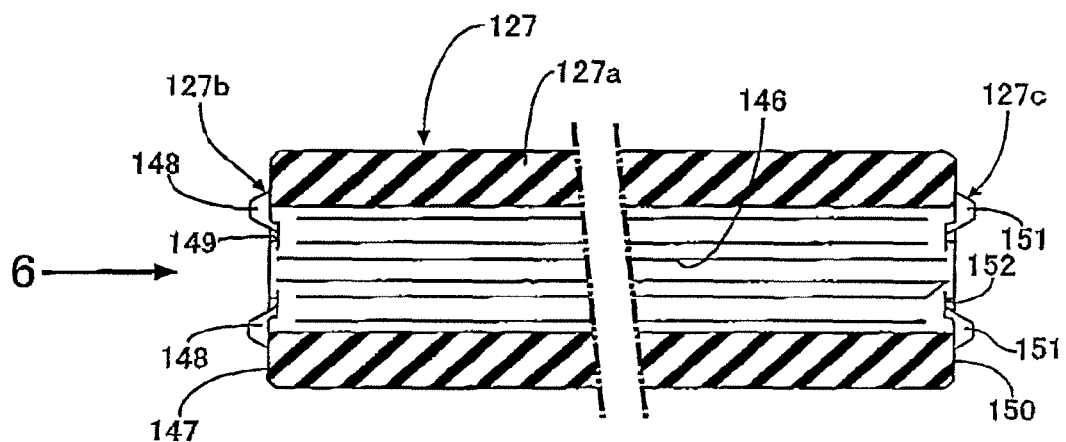
FIG. 5 is a longitudinal sectional view of an elastic body.

Referring to FIG. 5, the elastic body 127 is formed in a cylindrical shape by the use of an elastic material such as rubber so that the guide shaft 130 coaxially passes therethrough. The elastic body 127 is elastically deformed by the operation of the axial compressing force with the forward movement of the simulator piston 122, and the deformation thereof is stopped by the restraint of the control piston 46 in accordance with an increase in the axial compressing force.

In a natural state in which a load does not act, the elastic body 127 includes a cylindrical elastic main portion 127a, and irregular portions 127b and 127c which are respectively provided at both axial ends of the elastic main portion 127a, where the cylindrical elastic main portion and the irregular portions are integrated with each other. In addition, the irregular portions 127b and 127c are formed so that the deformation amounts of the irregular portions 127b and 127c are larger than the deformation amount of the elastic main portion 127a at the initial brake operation time.

Figure 6:
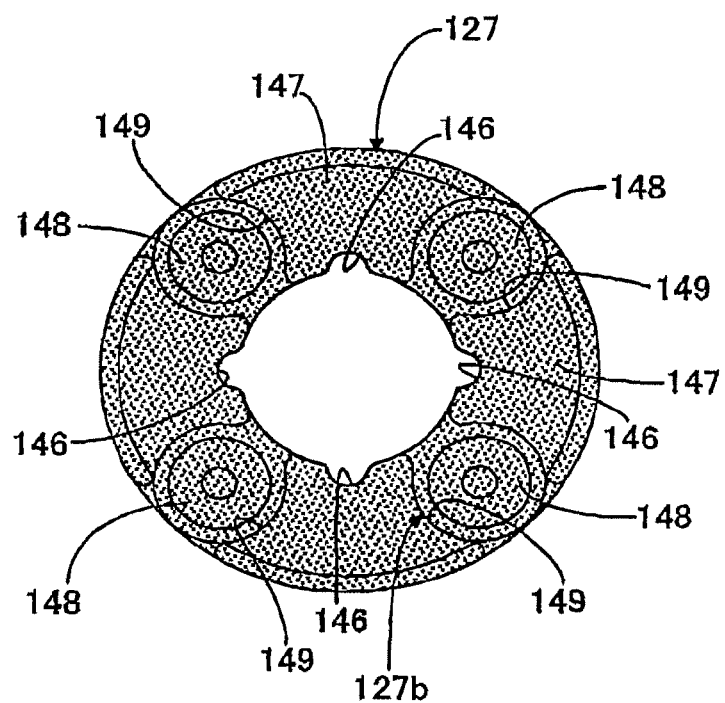
FIG. 6 is a view when seen in the direction of the arrow of FIG. 5.

Referring to FIG. 6, the irregular portion 127b formed in the front end of the elastic main body 127a while coming into contact with the disk portion 130a of the front end of the guide shaft 130 is formed such that a plurality of, for example, four protrusion portions 148 having the same interval therebetween protrude from annular flat surfaces 147, and each of the protrusion portions 148 is formed in a conical shape of which a diameter decreases toward the disk portion 130a. In addition, a groove 149 is formed in the flat surface 147 around each of the protrusion portions 148.

The irregular portion 127c formed in the rear end of the elastic main body 127a while coming in to contact with the simulator piston 122 is formed such that a plurality of, for example, four protrusion portions 151 having the same interval therebetween protrude from annular flat surfaces 150, and each of the protrusion portions 151 is formed in a conical shape of which a diameter decreases toward the disk portion 130a. In addition, a groove 152 is formed in the flat surface 150 around each of the protrusion portions 151.

In addition, the elastic body 127 has such a structure that a groove is formed in at least one of the outer peripheral portion of the elastic body 127 and the inner peripheral portion and front and rear both ends of the elastic body 127 so as to form a circulation path 145 for permitting the circulation of the operation fluid from the front end to the rear end of the elastic body 127, where the circulation path is used to permit the circulation of the operation fluid from the front end to the rear end of the elastic body 127 in the state where the forward stroke of the control piston 46 is less than at least a predetermined stroke for allowing the stroke fluid chamber 121 to be in a fluid pressure lock state. In the first embodiment, the circulation path 145 is formed by a plurality of grooves 146 formed in the entire axial length of the inner peripheral portion of the elastic body 127, and the grooves 149 and 152 respectively formed in the front and rear both ends of the elastic body 127.

The circulation path 145 is formed to be closed when a filling rate of the elastic body 127 reaches a predetermined value or more, where the filling rate indicates the ratio of the volume of the elastic body 127 existing in a space defined by the inner periphery of the control piston 46, the outer periphery of the guide shaft 130, the rear surface of the disk portion 130a of the front end of the guide shaft 130, and the front end surface of the simulator piston 122 in the filling area where the deformation of the elastic body 127 is stopped by the restraint of the control piston 46. As for the closing of the circulation path 145, the circulation path 145 may be closed in such a manner that the whole circumference of the inner periphery including the groove 146 of the elastic body 127 comes into close contact with the outer periphery of the guide shaft 130. In addition, the circulation path 145 may be closed in such a manner that at least one of the front and rear both ends of the elastic body 127 comes into close contact with at least one of the front end wall 46a and the simulator piston 122.

Then, the elastic body 127 is installed so that the axial compressing force acts between the simulator piston 122 and the disk portion 130a of the guide shaft 130 coming into contact with the front end wall 46a of the front end of the control piston 46 in a non-operation state of the brake pedal 11, that is, a brake non-operation state.

Incidentally, in the simulator piston 122, a plurality of paths 142 each having an inner end opened from the bottomed hole 132 is formed along the radial direction of the simulator piston 122 so as to be located on the front side of the portion mounted with the seal member 126. Accordingly, there is not a case in which the inside of the bottomed hole 132 is pressured or depressurized by the relative movement of the guide shaft 130 and the simulator piston 122 in the forward/backward direction.

With such a configuration, the stroke fluid chamber 121 communicates with the release chamber 82 via the openings 133 until the openings 133 are closed by the seal stopper 135 during the forward movement of the control piston 46 so that the stroke fluid chamber 121 is in a fluid pressure lock state.

Next, the operation of the first embodiment will be described. The stroke simulator 14A is provided between the fluid pressure booster 13 and the brake pedal 11 so as to obtain the operation stroke sensation of the brake pedal 11. The stroke simulator 14A includes the simulator piston 122 which is accommodated to be axially slidable in the cylindrical control piston 46 constituting a part of the fluid pressure booster 13, and is connected to the brake pedal 11, the cylindrical elastic body 127 which is formed in a cylindrical shape so as to springily contact with the inner periphery of the control piston 46 while being bent in accordance with the operation of the axial compressing force with the forward movement operation of the simulator piston 122, and is formed of rubber accommodated between the simulator piston 122 and the control piston 46, and the guide shaft 130 which is inserted into the elastic body 127 so as to axially guide the simulator piston 122 inside the control piston 46, and to regulate the inward bending in the radial direction of the elastic body 127. The elastic body 127 is formed such that the cylindrical elastic main body 127a is integrated with the irregular portions 127b and 127c provided in both axial ends of the elastic main body 127a, and the irregular portions 127b and 127c is formed so that the deformation amounts of the irregular portions 127b and 127c are larger than the deformation amount of the elastic main body 127a at the initial brake operation state.

Accordingly, in the initial load area where the brake operation load is small at the initial brake operation state of the brake pedal 11, the deformation amounts of the irregular portions 127b and 127c are larger than the deformation amount of the elastic main body 127a. Accordingly, it is possible to obtain the characteristic variations of the invalid stroke and the valid stroke by a comparatively small brake operation load at the initial brake operation state. In the stroke simulator in which the elastic body and the spring are connected in series, there is a sense of incompatibility due to too excessive variations in the characteristic at the transition period from the spring area to the elastic area. On the contrary, when smooth characteristic variations are obtained from the invalid stroke and the valid stroke, it is possible to improve the initial brake operation sensation. In addition, since the spring is not necessary, it is possible to decrease the number of components, and to reduce the cost thereof. Also, it is possible to freely change the simulator characteristics of the stroke simulator 14A by the use of a variation in the shape of the irregular portions 127b and 127c. Particularly, a variation in the deformation amounts of the irregular portions 127b and 127c is valid in the adjustment of the invalid stroke.

In addition, since the irregular portions 127b and 127c are formed such that the protrusion portions 148 and 151 protrude from the flat surfaces 147 and 150, it is possible to easily change the initial characteristics by changing the shapes of the protrusion portions 148 and 151. Further, since the plurality of protrusion portions 148 and 151 protrude from the flat surfaces 147 and 150, it is possible to further easily change the initial characteristics by changing the number of the protrusion portions 148 and 151.

Further, since the recess portions 149 and 152 are formed in a groove shape in the flat surfaces 147 and 150 around the protrusion portions 148 and 151, it is possible to alleviate the distortion caused by the deformation of the protrusion portions 148 and 151 by the use of the recess portions 149 and 152, and thus to further improve the operation sensation.

Furthermore, since the elastic body 127 is installed between the simulator piston 122 and the control piston 46 while being compressed in the axial direction in the non-operation state of the brake pedal 11, even when settling occurs in the elastic body 127, the settling can be absorbed by the irregular portions 127b and 127c.

Moreover, since a part of the inner peripheral surface of the control piston 46 is formed in a taper shape of which the diameter decreases forward, it is possible to improve the operation sensation by regulating the deformation of the front portion of the elastic body 127 at the early timing.

In addition, since the molded elastic body 127 is formed in a shape which permits the circulation of the operation fluid from the front end to the rear end of the elastic body 127 in the state where the forward stroke of the control piston 46 is less than at least the predetermined stroke, it is possible to reduce processing costs and to simplify the shape of the guide shaft 130, compared with the known elastic body in which the circulation path is formed in the guide shaft 130.

Figure 7:
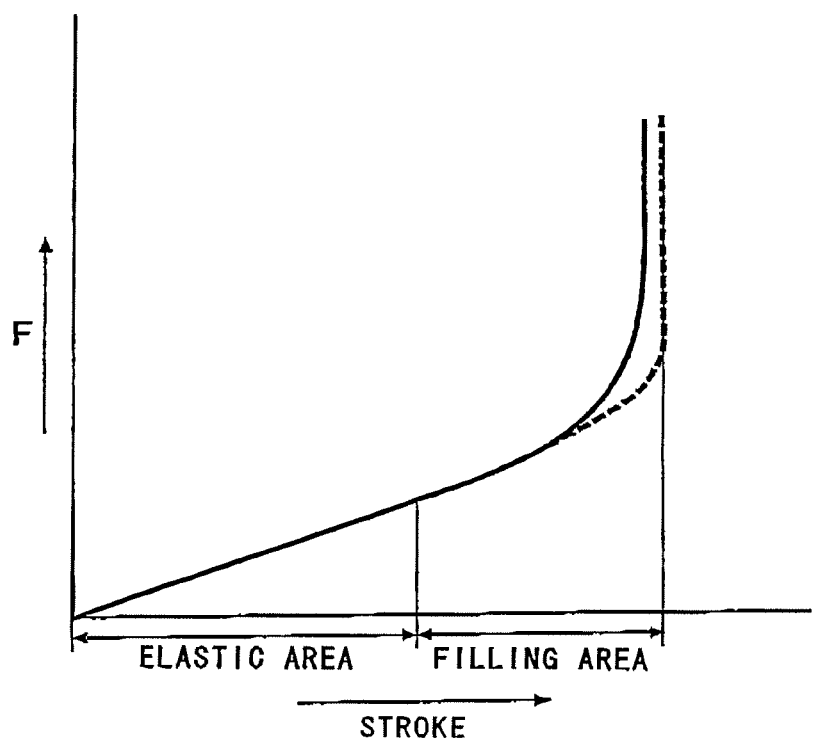
FIG. 7 is a characteristic diagram showing a relationship between an operation load and a stroke in the stroke simulator.

Here, the relationship between the stroke and the load of the stroke simulator 14A is changed as depicted by the solid line of FIG. 7. The elastic body 127 enters the filling area where the deformation of the elastic body 127 is stopped by the restraint of the control piston 46 through the elastic area where the elastic body 127 is elastically bent between the control piston 46 and the guide shaft 130 as the stroke increases. However, since the circulation path 145 is closed when the filling rate of the elastic body 127 reaches a predetermined value or more, the operation fluid is sealed between the elastic body 127 and the control piston 46, and hence an internal pressure occurs in a part of the inside of the control piston 46. Also, the elastic body 127 is prevented from being deformed more than necessary in the high step-in force area of the brake pedal 11, thereby improving the stroke characteristics and the stroke sensation. That is, when the elastic effect, the filling effect, and the effect of the internal pressure of the control piston 46 are gradually exhibited in the stroke simulator 14A, it is possible to improve the stroke sensation by the improvement of the stroke characteristics. On the contrary, in the configuration in which the circulation path 145 is not closed, there is a possibility that the elastic body 127 is deformed more than necessary in the high step-in force area of the brake pedal 11 as depicted by the dotted line of FIG. 7.

In addition, in the plurality of grooves 146 formed in the entire length in the axial direction of the inner peripheral portion of the elastic body 127, and the grooves 149 and 152 respectively provided in the front and rear both ends of the elastic body 127, the circulation path 145 is formed so as to permit the circulation of the operation fluid from the front end to the rear end of the elastic body 127, and the grooves 146, 149, and 152 can be formed at the same time when the elastic body 127 is formed. Accordingly, it is not necessary to perform the processing process on the elastic body 127. In addition, the shape, the arrangement, and the number of the grooves 146, 149, and 152 can be easily selected. Accordingly, it is possible to change the predetermined value of the filling rate by the shape, the arrangement, and the number of the grooves 146, 149, and 152.

Further, since the circulation path 145 is closed in such a manner that the whole circumference of the inner periphery of the elastic body 127 comes into close contact with the outer periphery of the guide shaft 130, or at least one of the front and rear both ends of the elastic body 127 comes into close contact with at least one of the front end wall 46a and the simulator 122, it is possible to close the circulation path 145 at low cost without the need of a particular structure for closing the circulation path 145.

Second Embodiment

Figure 8:
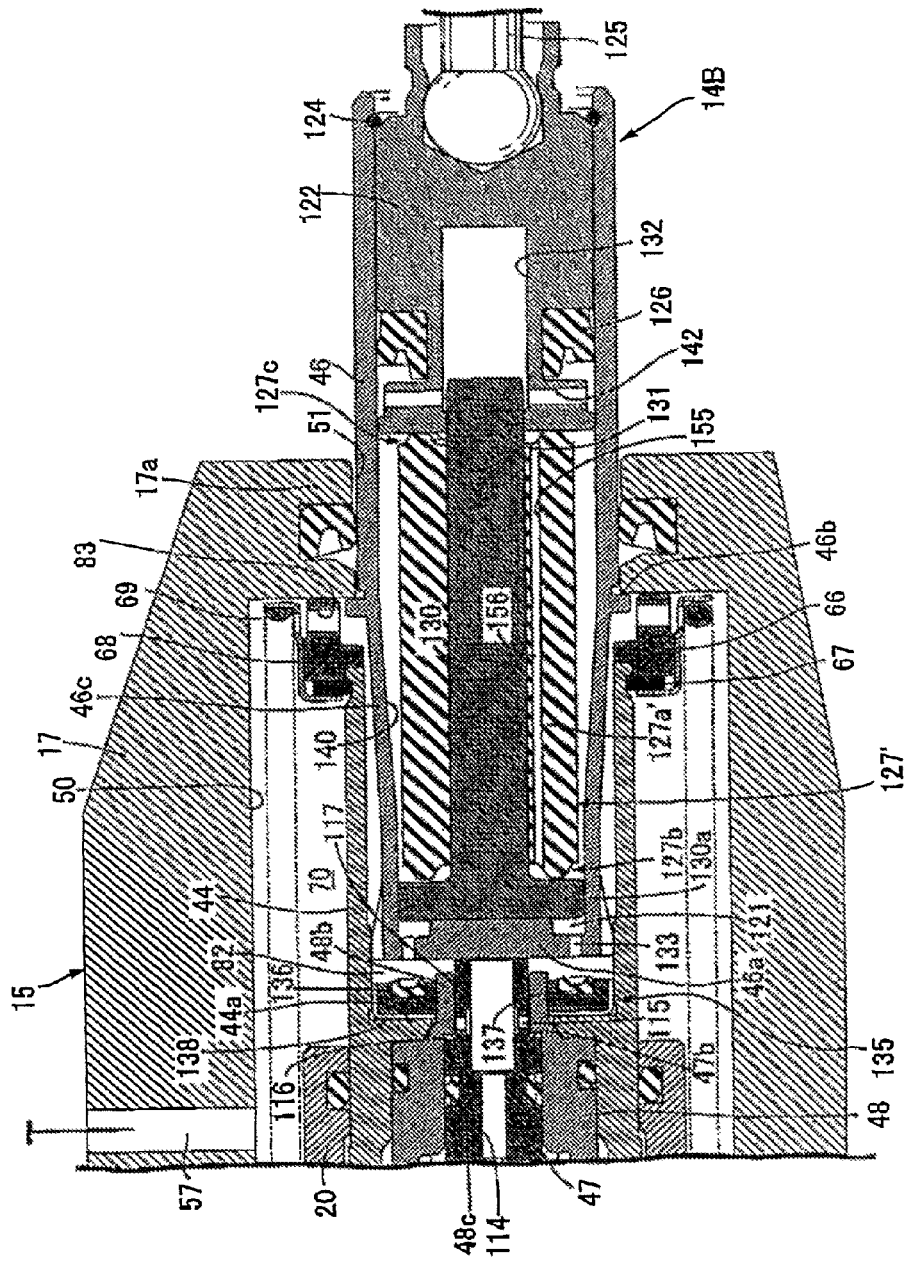
FIG. 8 is a cross-sectional view corresponding to FIG. 4 of the second embodiment.

The second embodiment of the invention will be described with reference to FIG. 8. However, the same reference numerals are given to the constituents corresponding to the first embodiment, and the description thereof will be omitted.

A stroke simulator 14B includes the simulator piston 122 which is fluid-tightly and axially slidably fitted to the rear portion of the control piston 46 while forming a stroke fluid chamber 121 in a gap with respect to the front end wall 46a of the front end of the control piston 46, the guide shaft 130 which is coaxially disposed inside the control piston 46 while its front end comes into contact with the front end wall 46a, and its rear portion is relatively slidably supported to the simulator piston 122, and the elastic body 127' which surrounds the guide shaft 130 while being interposed between the front end wall 46a of the control piston 46 and the simulator piston 122, and is accommodated in the stroke fluid chamber 121.

In addition, in a natural state in which a load does not act, the elastic body 127' is molded to include a cylindrical elastic main portion 127a', and irregular portions 127b and 127c which are respectively provided at both axial ends of the elastic main portion 127a', where the cylindrical elastic main portion and the irregular portions are integrated with each other.

Further, in the second embodiment, the elastic body 127' has such a structure that a perforation hole 156 is formed between the front end and the rear end of the elastic main body 127a' so as to form a circulation path 155 for permitting the circulation of the operation fluid in the elastic main portion 127a' of the elastic body 127' together with the grooves 149 and 152 (refer to the first embodiment) of the irregular portions 127b and 127c, where the circulation path is used to permit the circulation of the operation fluid from the front end to the rear end of the elastic body 127' in the case where the forward stroke of the control piston 46 is less than at least the predetermined stroke for allowing the stroke fluid chamber 121 to be in the fluid pressure lock state.

Furthermore, the circulation path 155 is formed to be closed when the filling rate of the elastic body 127 reaches a predetermined value or more in the filling area where the deformation of the elastic body 127' is stopped by the restraint of the control piston 46. The circulation path 155 is closed in such a manner that the perforation hole 156 is closed by the deformation of the elastic body 127' in the state where the outer periphery and the inner periphery thereof are restrained by the control piston 46 and the guide shaft 130. However, the circulation path is closed in such a manner that at least one of the front and rear both ends of the elastic body 127' comes into close contact with at least one of the front end wall 46a and the simulator piston 122.

Even in the second embodiment, the same advantage as that of the first embodiment can be obtained. In addition, since the perforation hole 156 can be formed at the same time when the elastic body 127' is formed, it is not necessary to perform the processing process on the elastic body 127'. Further, since the shape, the arrangement, and the number of the perforation holes 156 can be easily selected, it is possible to change the predetermined value of the filling rate by the shape, the arrangement, and the number of the perforation holes 156. Accordingly, it is possible to improve the stroke sensation.

Third Embodiment

Figure 9:
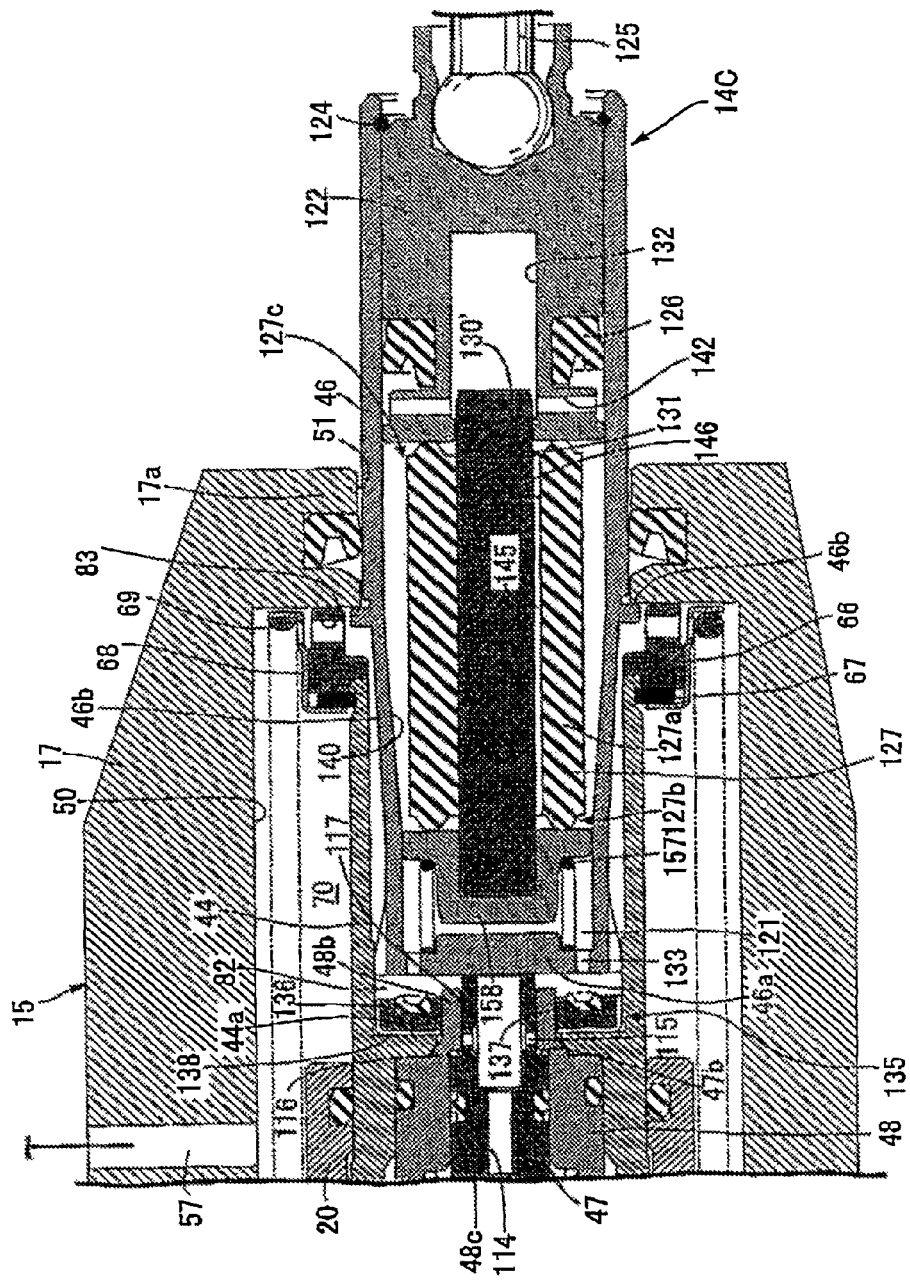
FIG. 9 is a cross-sectional view corresponding to FIG. 4 of the third embodiment.

The third embodiment of the invention will be described with reference to FIG. 9. However, the same reference numerals are given to the constituents corresponding to the first embodiment, and the description thereof will be omitted.

The stroke simulator 14C includes the simulator piston 122 which is fluid-tightly and axially slidably fitted to the rear portion of the control piston 46 while forming a stroke fluid chamber 121 in a gap with respect to the front end wall 46a of the front end of the control piston 46, a spring 157 of which the front end comes into contact with the front end wall 46a, a slide member 158 which comes into contact with the rear end of the spring 157, and is accommodated in the stroke fluid chamber 121 while being connected to the front end wall 46a of the control piston 46 via the spring 157, a cylindrical guide shaft 130' which is coaxially disposed inside the control piston 46 while its front end comes into contact with the slide member 158 to be fitted thereto, and its rear portion is relatively slidably supported to the simulator piston 122, and the elastic body 127 which surrounds the guide shaft 130' while being interposed between the slide member 158 and the simulator piston 122, and is accommodated in the stroke fluid chamber 121.

According to the third embodiment, it is possible to reduce processing costs and to simplify the shapes of the guide shaft 130' and the slide member 158, compared with the known elastic body in which the circulation path is formed in the guide shaft 130' and the slide member 158.

As still another embodiment of the invention, an elastic body may be formed in such a manner that an annular gap is formed between the guide shafts 130 and 130' and the inner peripheral portion of the elastic body accommodated in the control piston 46 in the natural state of the elastic body. Accordingly, the gap may be formed by at least a part of the circulation path of the operation fluid. In this case, at the time when the circulation path is closed as the filling rate of the elastic body reaches a predetermined value or more in the filling area, the circulation path may be closed in such a manner that the outer periphery of the elastic body comes into close contact with the inner periphery of the control piston 46.

While the embodiments of the invention have been described, the invention is not limited to the above-described embodiments, and its design may be modified into various forms without departing from the scope of the claims of the invention.

What is claimed is:

1. A vehicle brake device comprising:
a fluid pressure booster including a control piston having a front end wall formed at its front end and formed in a bottomed cylindrical shape, the fluid pressure booster being configured to adjust and apply a fluid pressure of a fluid pressure generating source to a boosting fluid pressure chamber in accordance with the operation of the control piston in the axial direction so that a reaction force based on a fluid pressure of the boosting fluid pressure chamber is equal to a brake operation input from a brake operation member; and
a stroke simulator including:
 a simulator piston fluid-tightly and slidably connected to the rear portion of the control piston while forming a stroke fluid chamber for introducing an operation fluid thereinto in a gap with respect to the front end wall, and connected to the brake operation member;
 a guide shaft coaxially disposed inside the control piston while allowing its front end to come into contact with the front end wall or a slide member accommodated in the stroke fluid chamber to be connected to the front end wall and allowing its rear end to be relatively slidably supported to the simulator piston; and
 an elastic body surrounding the guide shaft while being interposed between the front end wall or the slide member and the simulator piston, and accommodated in the stroke fluid chamber, and which is provided between the control piston and the brake operation member so as to stop a forward movement of the simulator piston relative to the control piston by sealing the operation fluid inside the stroke fluid chamber in a forward stroke not less than a predetermined stroke of the control piston, wherein:
a master cylinder is operated in accordance with the fluid pressure of the boosting fluid pressure chamber;
the elastic body is formed such that the circulation of the operation fluid is permitted from the front end to the rear end of the elastic body until a filling rate of the elastic body reaches a predetermined value in a filling area where deformation of the elastic body is stopped by restraint of the control piston in the state where a forward stroke of the control piston is less than at least the predetermined stroke, but the circulation of the operation fluid is stopped when the filling rate reaches the predetermined value or more; and
the elastic body is formed such that a circulation path is formed in at least one of a gap between the inner peripheral portion of the control piston and the outer peripheral portion of the elastic body, a gap between the front end wall of the control piston or the slide member and the front end of the elastic body, a gap between the simulator piston and the rear end of the elastic body, and a gap between the outer peripheral portion of the guide shaft and the inner peripheral portion of the elastic body, where the circulation path is formed to be closed when the elastic body comes into close contact with at least one of the inner peripheral portion of the control piston, the outer peripheral portion of the guide shaft, the front end wall of the control piston or the slide member, and the simulator piston, and is used to permit the circulation of the operation fluid from the front end to the rear end of the elastic body.

2. A vehicle brake device comprising:
a fluid pressure booster including a control piston having a front end wall formed at its front end and formed in a bottomed cylindrical shape, the fluid pressure booster being configured to adjust and apply a fluid pressure of a fluid pressure generating source to a boosting fluid pressure chamber in accordance with the operation of the control piston in the axial direction so that a reaction force based on a fluid pressure of the boosting fluid pressure chamber is equal to a brake operation input from a brake operation member; and a stroke simulator including:
   a simulator piston fluid-tightly and slidably connected to the rear portion of the control piston while forming a stroke fluid chamber for introducing an operation fluid thereinto in a gap with respect to the front end wall, and connected to the brake operation member;
   a guide shaft coaxially disposed inside the control piston while allowing its front end to come into contact with the front end wall or a slide member accommodated in the stroke fluid chamber to be connected to the front end wall and allowing its rear end to be relatively slidably supported to the simulator piston; and
   an elastic body surrounding the guide shaft while being interposed between the front end wall or the slide member and the simulator piston, and accommodated in the stroke fluid chamber, and which is provided between the control piston and the brake operation member so as to stop a forward movement of the simulator piston relative to the control piston by sealing the operation fluid inside the stroke fluid chamber in a forward stroke not less than a predetermined stroke of the control piston, wherein:

a master cylinder is operated in accordance with the fluid pressure of the boosting fluid pressure chamber;

the elastic body is formed such that the circulation of the operation fluid is permitted from the front end to the rear end of the elastic body until a filling rate of the elastic body reaches a predetermined value in a filling area where deformation of the elastic body is stopped by restraint of the control piston in the state where a forward stroke of the control piston is less than at least the predetermined stroke, but the circulation of the operation fluid is stopped when the filling rate reaches the predetermined value or more; and the elastic body is provided with a perforation hole which is provided between the front end and the rear end of the elastic body, and is closed when the elastic body is compressed in the radial direction, the perforation hole constituting at least a part of the circulation path for permitting the circulation of the operation fluid.

3. The vehicle brake device according to claim 1, wherein the elastic body is formed of rubber.

4. The vehicle brake device according to claim 1, wherein the elastic body includes an irregular portion formed in a front end of the elastic body, near the front end wall,
   the irregular portion forms a plurality of protrusion portions having a same interval therebetween which protrude from an annular flat surface,
   each of the protrusion portions is formed in a conical shape with a decreasing diameter, and
   a groove is formed in the annular flat surface around each of the protrusion portions.

5. The vehicle brake device according to claim 4, wherein the elastic body has irregular portions formed in a rear end and which come in to contact with the simulator piston,
   the irregular portions formed in the rear end are a plurality of protrusion portions having a same interval therebetween and which protrude from an annular flat surface in the rear end,
   each of the protrusion portions on the rear end is formed in a conical shape with a decreasing diameter, and
   a groove is formed in the annular flat surface around each of the protrusion portions in the rear end.

6. The vehicle brake device according to claim 1, wherein the elastic body has grooves which form the circulation path.

7. The vehicle brake device according to claim 6, wherein the grooves are formed in at least an inner peripheral portion of the elastic body.

8. The vehicle brake device according to claim 7, wherein the grooves are formed in at least an outer peripheral portion of the elastic body.

9. The vehicle brake device according to claim 8, wherein the grooves are formed in at least both front and rear ends of the elastic body.

10. The vehicle brake device according to claim 7, wherein the grooves are formed in an entire axial length of the inner peripheral portion of the elastic body.

11. The vehicle brake device according to claim 7, wherein the circulation path is closed in such a manner that a whole circumference of the inner periphery including the grooves formed on the inner peripheral portion of the elastic body comes into close contact with an outer periphery of the guide shaft.

12. The vehicle brake device according to claim 11, wherein
   the circulation path is closed in such a manner that at least one of the front and rear ends of the elastic body come into close contact with at least one of the front end wall and the simulator piston.

13. The vehicle brake device according to claim 1, wherein
   a perforation hole is between a front end and rear end of the elastic body so as to form the circulation path in the elastic elastic body together with grooves of irregular portions,
   the circulation path is closed in such a manner that the perforation hole is closed by the deformation of the elastic body in a state where an outer periphery and an inner periphery thereof are restrained by the control piston and the guide shaft, and
   the circulation path is closed in such a manner that at least one of front and rear ends of the elastic body comes into close contact with at least one of the front end wall and the simulator piston.

14. The vehicle brake device according to claim 1, wherein the elastic body has an annular gap formed between the guide shaft and an inner peripheral portion of the elastic body accommodated in the control piston.

15. A vehicle brake device comprising:
   a fluid pressure booster including a control piston having a front end wall formed at its front end and formed in a bottomed cylindrical shape, and being configured to adjust and apply a fluid pressure of a fluid pressure generating source to a boosting fluid pressure chamber in accordance with the operation of the control piston in the axial direction so that a reaction force based on a fluid pressure of the boosting fluid pressure chamber is equal to a brake operation input from a brake operation member; and
   a stroke simulator including:
      a simulator piston fluid-tightly and slidably connected to the rear portion of the control piston while forming a stroke fluid chamber for introducing an operation fluid thereinto in a gap with respect to the front end wall, and connected to the brake operation member;
      a guide shaft coaxially disposed inside the control piston while allowing its front end to come into contact with the front end wall or a slide member accommodated in the stroke fluid chamber to be connected to the front end wall and allowing its rear end to be relatively slidably supported to the simulator piston; and an elastic body surrounding the guide shaft while being interposed between the front end wall or the slide member and the simulator piston, and accommodated in the stroke fluid chamber, and which is provided between the control piston and the brake operation member so as to stop a forward movement of the simulator piston relative to the control piston by sealing the operation fluid inside the stroke fluid chamber in a forward stroke not less than a predetermined stroke of the control piston, wherein:

a master cylinder is operated in accordance with the fluid pressure of the boosting fluid pressure chamber;

the elastic body is formed in a shape in which the circulation of the operation fluid is permitted from the front end to the rear end of the elastic body in the state where a forward stroke of the control piston is less than at least the predetermined stroke;

the elastic body is formed such that a circulation path is formed in at least one of a gap between the inner peripheral portion of the control piston and the outer peripheral portion of the elastic body, a gap between the front end wall of the control piston or the slide member and the front end of the elastic body, a gap between the simulator piston and the rear end of the elastic body, and a gap between the outer peripheral portion of the guide shaft and the inner peripheral portion of the elastic body so as to permit the circulation of the operation fluid from the front end to the rear end of the elastic body; and a groove is formed in at least one of the inner peripheral portion and the front and rear both ends of the elastic body and the outer peripheral portion of the elastic body so as to form the circulation path for permitting the circulation of the operation fluid from the front end to the rear end of the elastic body.

16. The vehicle brake device according to claim 15, wherein the elastic body is formed of rubber.

17. A vehicle brake device comprising:

a fluid pressure booster including a control piston having a front end wall formed at its front end and formed in a bottomed cylindrical shape, and being configured to adjust and apply a fluid pressure of a fluid pressure generating source to a boosting fluid pressure chamber in accordance with the operation of the control piston in the axial direction so that a reaction force based on a fluid pressure of the boosting fluid pressure chamber is equal to a brake operation input from a brake operation member; and a stroke simulator including:

a simulator piston fluid-tightly and slidably connected to the rear portion of the control piston while forming a stroke fluid chamber for introducing an operation fluid thereinto in a gap with respect to the front end wall, and connected to the brake operation member;

a guide shaft coaxially disposed inside the control piston while allowing its front end to come into contact with the front end wall or a slide member accommodated in the stroke fluid chamber to be connected to the front end wall and allowing its rear end to be relatively slidably supported to the simulator piston; and an elastic body surrounding the guide shaft while being interposed between the front end wall or the slide member and the simulator piston, and accommodated in the stroke fluid chamber, and which is provided between the control piston and the brake operation member so as to stop a forward movement of the simulator piston relative to the control piston by sealing the operation fluid inside the stroke fluid chamber in a forward stroke not less than a predetermined stroke of the control piston, wherein:

a master cylinder is operated in accordance with the fluid pressure of the boosting fluid pressure chamber;

the elastic body is formed in a shape in which the circulation of the operation fluid is permitted from the front end to the rear end of the elastic body in the state where a forward stroke of the control piston is less than at least the predetermined stroke; and the elastic body is provided with a perforation hole which is provided between the front end and the rear end of the elastic body so as to constitute at least a part of the circulation path for permitting the circulation of the operation fluid.

* * * * *